United States Patent [19]

Gibson

[11] 4,272,786
[45] Jun. 9, 1981

[54] VIDEO DISC PLAYBACK APPARATUS WITH NON-LINEAR APERTURE CORRECTION

[75] Inventor: John J. Gibson, Princeton, N.J.

[73] Assignee: RCA Corporation, New York, N.Y.

[21] Appl. No.: 75,330

[22] Filed: Sep. 19, 1979

Related U.S. Application Data

[63] Continuation-in-part of Ser. No. 951,382, Oct. 16, 1978, abandoned.

[51] Int. Cl.³ .......................... H04N 5/76; H04N 5/78
[52] U.S. Cl. .................................... 358/128.5; 358/8; 360/36
[58] Field of Search ..................... 358/128.5, 127, 8, 4; 360/33, 36

[56] References Cited

U.S. PATENT DOCUMENTS

| | | | |
|---|---|---|---|
| 3,879,748 | 4/1975 | DeBoer | 358/8 |
| 3,930,117 | 12/1975 | Clemens et al. | 358/8 |
| 3,934,263 | 1/1976 | Palmer | 358/4 |
| 3,984,867 | 10/1976 | Harnandez | 358/127 |
| 3,988,531 | 10/1976 | Laub | 360/36 |
| 4,124,208 | 2/1979 | Oprandi et al. | 358/127 |
| 4,150,395 | 4/1979 | Pritchard | 358/8 |
| 4,166,251 | 8/1979 | Ishigaki et al. | 329/132 |

FOREIGN PATENT DOCUMENTS

| | | |
|---|---|---|
| 1013481 | 12/1965 | United Kingdom . |
| 1337397 | 11/1973 | United Kingdom . |
| 1379774 | 1/1975 | United Kingdom . |
| 1403343 | 8/1975 | United Kingdom . |
| 1468611 | 3/1977 | United Kingdom . |
| 1473532 | 5/1977 | United Kingdom . |
| 1473533 | 5/1977 | United Kingdom . |
| 1476772 | 6/1977 | United Kingdom . |
| 1495784 | 12/1977 | United Kingdom . |
| 1528138 | 10/1978 | United Kingdom . |
| 1528324 | 10/1978 | United Kingdom . |

OTHER PUBLICATIONS

"Gamma Correction", Colour Television, vol. 1, Principles and Practice, P. S. Carnt et al., London, ILIFFE, Ltd. (1961), pp. 84-86.

"Gamma Correction", Principles of Colour Television, by Hazeltine Laboratories Staff Editors, Knox McIlwain, E. E. et al., New York, John Wiley & Sons, Inc. (1956), pp. 124-127.

Primary Examiner—Daryl W. Cook
Attorney, Agent, or Firm—E. M. Whitacre; J. S. Tripoli; J. E. Roehling

[57] ABSTRACT

In a video disc playback apparatus, a playback stylus is utilized for the recovery of information from prerecorded disc records. In one system, geometric variations are recorded on the surface of the record and are representative of recorded picture and sound information. As these geometric variations pass beneath the stylus, the capacitance between the stylus electrode and the surface of the disc varies in accordance with the recorded representations. The capacitive variations are converted to electrical signal variations in the playback apparatus. In such a video disc playback apparatus, sound interference in the video and video interference in the sound can be produced by the non-linearity of the aforementioned pickup stylus. Use of a non-linear aperture corrector between the pickup circuitry and the demodulator circuitry of the playback apparatus reduces these interferences.

18 Claims, 9 Drawing Figures

VIDEO DISC PLAYBACK APPARATUS WITH NON-LINEAR APERTURE CORRECTION

This is a continuation-in-part of application Ser. No. 951,382 filed Oct. 16, 1978, now abandoned.

This invention relates generally to novel nonlinear systems and more particularly to a video disc record playback apparatus employing novel non-linear systems.

In U.S. Pat. No. 3,842,194 issued on Oct. 15, 1974 to Jon K. Clemens, video disc playback systems of a variable capacitance form are disclosed. In an arrangement therein described, an information track incorporates geometric variations in the bottom of a spiral groove in a disc, which may have a surface comprising conductive material covered with a thin coating of dielectric material. In another format, not disclosed in the Clemens patent, the disc may be formed of a conductive material, such as carbon, in a PVC base. Variations in the capacitance presented between a conductive electrode on a tracking stylus and the conductive material of the disc occur as the disc is rotated by a supporting turntable; the capacitance variations are sensed to recover the recorded information.

In one format employed for the grooved information track disclosed in the Clemens patent, depressed areas extending across the groove bottom alternate with non-depressed areas, with the frequency of alternation varying with the amplitude of video signals subject to recording. The form of the recorded signal is thus a carrier frequency modulated in accordance with video signals.

One technique for recording the desired information on a video disc master is described in U.S. Pat. No. 3,943,302, issued on Mar. 9, 1976 to Loren B. Johnston, and entitled "ELECTRON BEAM RECORDING IN THICK MATERIAL." Another technique for electromechanically recording the desired information on a video disc master is described in U.S. Pat. No. 4,044,379, issued on Aug. 23, 1971 to Jerome B. Halter, and entitled "METHOD AND APPARATUS FOR ELECTROMECHANICAL RECORDING OF SHORT WAVELENGTH MODULATION IN METAL."

The recording of a composite color video signal with a sound accompaniment may be achieved when the accompanying audio signals are caused to frequency modulate a low frequency sound carrier over a low frequency deviation range (illustratively, 716 KHz±50 KHz). In a picture carrier modulator, a composite color video signal (including luminance signals occupying a given band of frequencies and chrominance signals appearing as side band components of a modulated chrominance subcarrier interleaved with luminance signal components in an intermediate region of the given band) is caused to frequency modulate a high frequency picture carrier over a high frequency deviation range (illustratively, 4.3–6.3 MHz). The peak-to-peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which may be an electromechanical, optical or electron beam recorder controlled in response to the signal developed by the adder. Two signal formats have been successfully used: one in which the linear sum of the sound and video carrier is recorded and the other in which this linear sum has been limited to form a square wave which is duty cycle modulated by the sound carrier and frequency modulated by the video intelligence. The present invention can be used with both formats. The linear format will be used to explain the operation of the invention.

The recorder, wherein the recorded signal consists of the linear sum of a low frequency sound carrier and a high frequency video carrier, is used to record the desired information on a disc master. In one illustrative embodiment the master produced by such recording techniques will have a spiral track, the bottom of the track having undulations representative of the recorded signal.

A stamper disc may be derived from the recording master, as by techniques described in the Clemens' patent, and utilized, through record stamping machinery, to produce a plurality of replica discs of thermoplastic material, each replica disc having an information track comprising the undulations recorded in the disc master.

In a playback of a video disc record embodying the aforementioned format, under certain circumstances, sound interference in the video reproduction and video interference in the sound reproduction may be encountered which result in a distraction to the viewer. Tracking of the relief pattern on the disc with an ideal transducer will produce electrical signals identical to the signals recorded on the disc. However, it has been found that playback transducers generally distort the information retrieved from the disc. This distortion is linear as well as non-linear. The non-linear distortion causes interference in both the video and sound reproduction.

One possible explanation of the sound interference in the video with reference to a playback apparatus having a transducer of the type comprising a dielectric support and a conductive electrode is as follows. The dielectric support portion of the stylus is desirably of considerably greater length (along the information track) than the conductive electrode portion and since the signal recorded in the groove bottom consists of the linear sum of high and low frequency signals, the groove bottom may be described as a low frequency, slowly varying audio carrier with a high frequency video signal superimposed thereon. As a consequence, during record playback, the location of the stylus electrode bottom (in a direction perpendicular to the plane of the record) is primarily determined by the height of the information track bottom at an amplitude peak of the sound accompaniment (i.e., sound-hilltop) which supports the dielectric portion of the stylus. When information track bottom height variations (i.e., sound-hilltops v. sound-valleys) are encountered, differences in the spacing between the stylus electrode bottom and the track bottom will result.

In the previously-mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion; and (2) an asymmetrical structure, wherein the stylus electrode comprises a conductive coating on the rear surface of a dielectric support. The asymmetrical stylus form described above has proven to be generally desirable because of greater ease in stylus fabrication.

During playback of a rotating disc, the high dielectric constant of the dielectric support portion of the asymmetrical stylus (illustratively, sapphire or diamond) causes the electric field from the stylus to the disc to be concentrated on the dielectric support side of the electrode. As a result, the stylus "sees" the signal on the disc at a point which is not directly beneath its electrode, but skewed forward toward the oncoming signal. Therefore, as the stylus traverses a sound-valley, the sound carrier effects more phase advance of the video signal than it effects as the stylus traverses a sound-hilltop. Consequently, when track bottom height variations are encountered, a phase modulation of the video by the sound accompaniment results in an undesired sound interference in the reproduced picture (i.e., intermodulation products between the video and sound signals).

In U.S. Pat. No. 3,934,263, issued on Jan. 20, 1976 to R. C. Palmer, a reduction of the undesired sound interference is effected by deliberate introduction of a selected amount of phase modulation of the picture information by the sound information in the course of recording the information signal on the master disc. This technique is attractive to reduce the sound interference, however, replica discs stamped from molds produced from these masters may not be compatible with other playback transducers (e.g., pressure or optical).

The video interference (non-linear) which is heard in the sound accompaniment can not be explained in the same manner. One way of explaining the video interference is as follows. The modulated video carrier is partially demodulated by the non-linear characteristics of the stylus producing a base band video signal which overlaps the sound signals thereby causing interference in the sound accompaniment.

In accordance with the principles of the present invention a non-linear compensating means, or aperture corrector, is employed in a playback apparatus for information recovery from a record medium. In the playback apparatus, an information recovery means, having a non-linear response, will produce non-linear distortions in the form of interference in the information recovered from the information stored in the record medium. Non-linear compensating means, coupled to the information recovery means, effects a compensation of the signals recovered to reduce the interference.

In further accordance with the principles of the present invention, a non-linear compensating means, or aperture corrector, is employed to compensate for the non-linear response of the pickup stylus of a video disc playback apparatus.

In further accordance with the principles of the present invention, a reduction of the undesired interference in the playback of a video disc is effected by the use of a non-linear aperture corrector within the disc player apparatus as opposed to the recording of specially compensated signals on the disc record.

In one aspect of the present invention, a non-linear aperture corrector is provided to reduce sound interference in the video. In another aspect of the present invention, a non-linear aperture corrector is provided to reduce video interference in the sound.

In one embodiment of the present invention, sound interference in the video is reduced by using a non-linear device to effect a phase shift of the video signals recovered by the stylus in response to the instantaneous level of the recorded sound carrier. The phase shift in this embodiment may be effected by applying the recovered signal to an aperture correction system comprising the parallel combination of a capacitor and a diode. In this case the diode is oriented and biased such that during a time interval when the instantaneous level of the input sound carrier falls below a given value (i.e., corresponding to the stylus traversing a sound peak), the diode is rendered correspondingly less conductive; therefore, the transmission of the signals during that interval will be substantially effected through the capacitor. Signal passage through the capacitor results in the video signal being subjected to a phase advance. Of course, if the input sound carrier were inverted such that the sound carrier level rises as the stylus traverses a sound peak the diode orientation and biasing would be altered to effect a phase advance as the level rises.

In another embodiment of the present invention, video interference in the sound is reduced by providing an aperture corrector comprising a non-linear device which modulates the recovered signals. In this embodiment, a diode oriented and biased to reduce the level of the baseband video signal which overlaps the sound may be used. The modulated sound signals picked up by the stylus contain second order distortions; the diode being biased as mentioned above substantially eliminates these distortions.

In both embodiments described, the non-linear aperture correction necessary to reduce a particular interference level is subject to reasonably accurate prediction. During playback, however, the interference level is dependent upon a complex of variables, including a variety of recording parameters, recorded signal contents, information track convolution diameter, as well as other various playback parameters. Thus, circuit parameters (i.e., bias magnitude, average input signal level, circuit time constant, etc.) may not be readily selected to insure complete cancellation of the interference for all playback intervals under all possible circumstances.

Nevertheless, a set of circuit parameters may be chosen with the assurance that: (1) for a given range of interference levels, complete interference cancellation or a reduction of the interference level below a particular threshold will be achieved; (2) for interference levels below a given range, the interference level is reduced below a threshold which is distracting to a viewer (whereby the interference is at least less severe, if no other interference reduction scheme is additionally employed; whereas, if an additional interference reduction scheme is employed the requirements imposed thereon are lessened); or (3) for interference levels below said given range, the correction effected is not of such magnitude as to exceed that threshold which would be annoying in itself. In accordance with one embodiment of the present invention, a pre-set aperture corrector may be used to achieve the aforementioned results.

However, in certain other embodiments of the present invention, it may be found desirable to adjust the aperture corrector dependent upon the location of the track convolution subject to playback. In the case of an aperture corrector comprising the parallel combination of a capacitor and a diode, for example, the diode bias may be manually adjusted to reduce the sound beat as successive, more inwardly located, bands of groove convolutions are subject to playback. Advantageously, an automatic continuous increase of the bias magnitude may be effected as the playback stylus progresses toward the record center, through use of suitable position-responsive controls.

In the last mentioned embodiment, the aperture corrector is adjusted with the radial position of the stylus relative to the record, but the corrector is not adjusted in response to the detected level of the interference. In accordance with yet another embodiment of the present invention, the aperture corrector is made adjustable in response to the interference detected at the output of the aperture corrector. Advantageously, means are provided for continuously adjusting the aperture corrector in response to variations in the level of interference accompanying the signal to be processed. Means are provided for sensing the level of the interference accompanying the modulated signals and for developing a control voltage in response to the sensed interference level. This control voltage may be utilized to control the bias of a non-linear device to effect the above-mentioned adjustable aperture correction of the signals in response to detected levels of interference.

In accordance with yet another embodiment of the present invention, the input from the signal pickup circuit to the aperture correction system is provided through a variable attenuation amplifier. A feed-back loop couples an output of the aperture correction system to a control input of the variable attenuation amplifier to thereby keep the long term average level of the input video signal to the aperture correction system constant. By keeping the input signal to the aperture correction system constant, aperture correction for large input signals, due, for example, to worn styli having an enlarged width, would still be assured.

Figure 1:
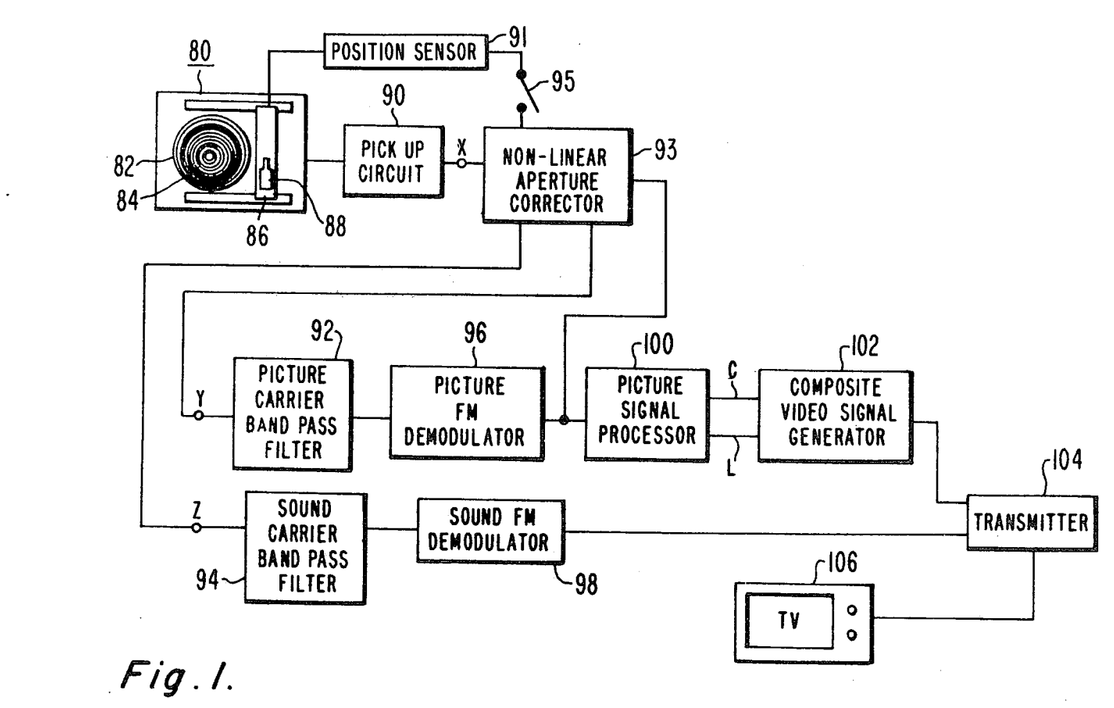
FIG. 1 illustrates, via a block diagram representation, playback apparatus, including a non-linear aperture correction stage, embodying the principles of the present invention.

Referring now to FIG. 1, a video disc player 80 (e.g., of the type shown in the above-mentioned Clemens patent) has a turntable 82 for rotatably supporting a video disc 84 having a spiral information track containing video signal information with sound signal information accompaniment. The player 80 further includes a carriage 86 which is subject to translation in synchronism with the radial motion of the player stylus during playback. The carriage 86 has a compartment for receiving a cartridge 88 which houses the signal pickup stylus.

A pickup circuit 90 responsive to the output of the signal pickup, develops at its output terminal, a signal representative of the recorded information. The signal at the output terminal of pickup circuit 90 may contain sound interference in the video and/or video interference in the sound. The pickup circuit 90 is illustratively of the type described in U.S. Pat. No. 4,070,625, issued on Mar. 21, 1978 to Kawamoto, et al.

The output of the pickup circuit 90 is delivered to a non-linear aperture corrector 93. The aperture corrector reduces the interference effected by the non-linear response of the recovery means. Specific embodiments of the aperture corrector will be discussed with reference to FIG. 2, infra.

The outputs of the non-linear aperture corrector are delivered to a pair of band pass filters 92 and 94. The picture carrier band pass filter 92 has a relatively wide pass band encompassing the deviation range of the high frequency picture carrier (e.g., 4.3–6.3 MHz) as well as the requisite adjacent side band region, and selectively passes the picture carrier component of the recorded signal to the relative exclusion of the sound carrier component thereof. The sound carrier band pass filter 94 has a relatively narrow pass band encompassing the deviation range of the low frequency sound carrier (e.g., 716 KHz±50 KHz) as well as requisite adjacent side band regions, and selectively passes the sound carrier component of the recorded signal to the relative exclusion of the picture carrier component.

The outputs of the respective band pass filters 92 and 94 are passed to respective demodulators 96 and 98. The picture demodulator 96 develops at its output terminal the recorded picture signal information inclusive of synchronizing components and, the sound demodulator 98 develops at its output the recorded audio signal information.

A picture signal processor 100, coupled to the picture demodulator 96, effects a separation of the chrominance information from the luminance information. A composite video signal generator 102 recombines the chrominance and the luminance information in accordance with, for example, the NTSC format. A transmitter 104 processes the sound, luminance and chrominance information to form a suitable signal for delivery to a color TV receiver 106. Receiver 106 then displays the color image and provides the audio information developed in accordance with the information signal previously recorded on video disc 84. Illustratively, when the signal delivery to the antenna terminals of a color TV receiver is desired, the circuits in transmitter 014 include means for combining the separated components to form a new composite signal, which composite signal modulates a suitable RF carrier. U.S. Pat. No. 4,097,899 issued on June 27, 1978 to J. P. Yu, illustratively describes a transmitter apparatus useful for providing the functions of transmitter 104. Position sensor 91 and switch 95 will be described with reference to FIGS. 2 and 3.

Figure 2:
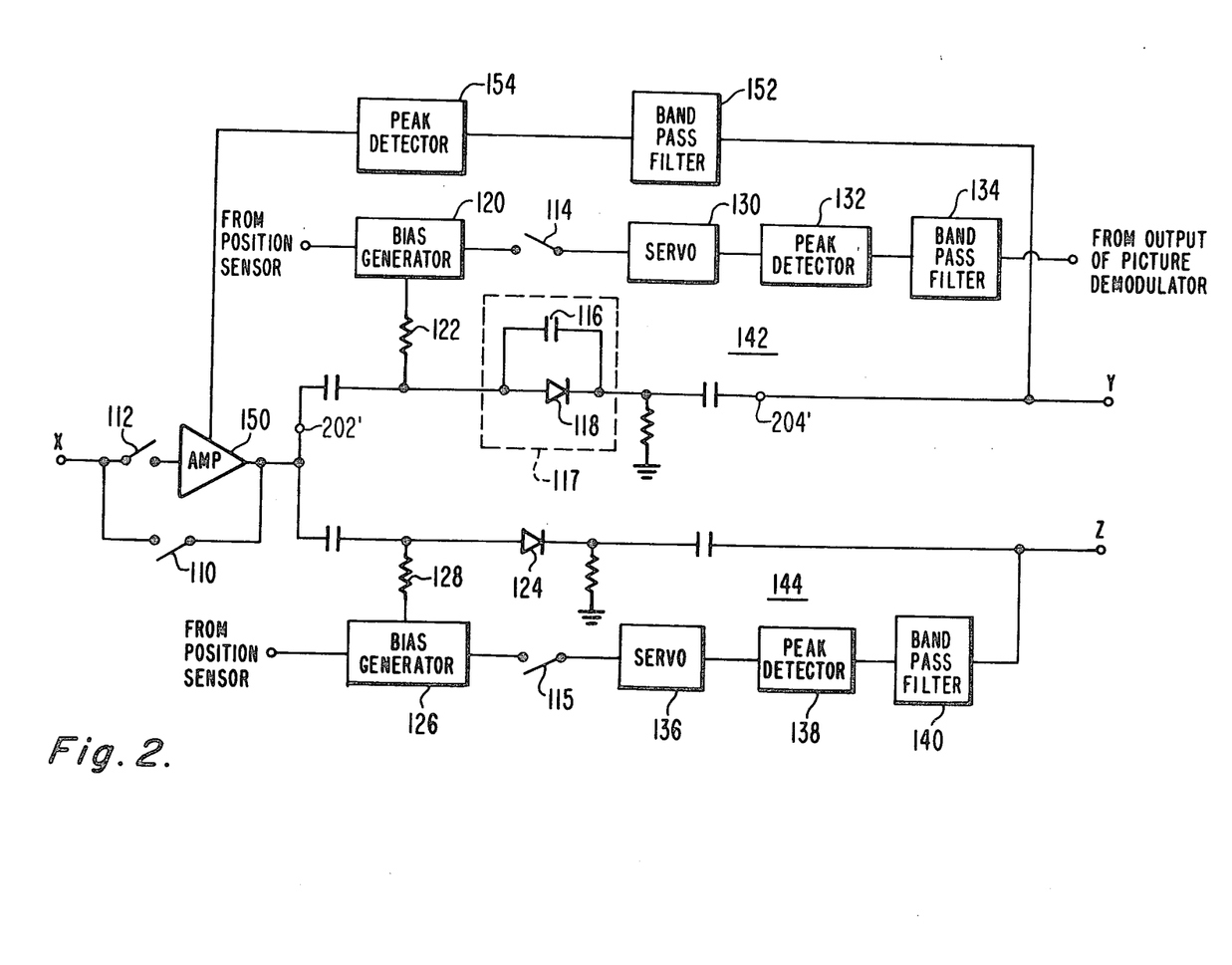
FIG. 2 illustrates a circuit embodiment partially in block diagram form for the non-linear aperture corrector of FIG. 1.

Referring to FIG. 2, the operation of the non-linear aperture corrector will be explained. With switch 110 closed and switches 112, 114 and 115 open, the aperture correction stage for reducing sound interference in the video comprises a non-linear device 117 for effecting a phase shift. The non-linear device 117 may be the parallel combination of a capacitor and a diode, a varactor diode, or other combinations of devices. This corrector 117 is interposed in the signal path between pickup circuit 90 and demodulator 96 of FIG. 1. In the embodiment shown in FIG. 2, corrector 117 comprises the parallel combination of a diode 118 and a capacitor 116. Diode 118 is forward biased to the "knee" of its characteristic curve by a bias current supplied from a bias generator 120 through a bias resistor 122. The operation of bias generator 120 will be explained with reference to FIG. 4. During a time interval when the sound level of the input signal changes in the negative direction, corresponding to the incidence of groove bottom height variations, the conduction of the diode 118 will diminish proportionally, forcing a larger component of the applied signal to pass through the capacitor 116. Since it will be appreciated that signal passage through capacitor 116 effects a differentiation (and hence a phase advance) of the transmitted signal component, the combination of capacitor 116 and diode 118 effectively modulates, both in phase and amplitude, the applied base band signal in accordance with groove bottom height variations.

Aperture correction for video interference in the sound accompaniment comprises another non-linear device which is in the signal path between pickup circuit 90 and filter 94 of FIG. 1. In the embodiment shown in FIG. 2, this other non-linear device comprises diode 124. Diode 124 is forward biased to the "knee" of its characteristic curve by a bias current supplied from another bias generator 126 through bias resistor 128.

Advantageously, the bias generators 120 and 126, provide a variable diode bias level, when the contacts of switches 114 and 115 are closed. Feedback loop 142 functions as follows. A band pass filter 134, coupled to the output of picture FM demodulator 96 of FIG. 1 is tuned to pass frequencies where the sound interference is present (e.g., 716 KHz). The sound interference signals are passed to peak detector 132. The peak detector output is coupled to a servo apparatus 130 for minimizing sound interference. The servo apparatus output is coupled, via the closed contacts of switch 114, to an input of bias generator 120 which provides a DC bias output current in response to the output of the servo apparatus 130. The operation of generator 120 and servo apparatus 130 will be explained with reference to FIGS. 4 and 5, respectively. The servo apparatus adjusts the output of the bias generator 120 to minimize sound interference. The output of the bias generator 120 is, in turn, utilized to control the bias of the diode 118 in a manner which effects adjustable aperture correction of the signal. When the detected level of sound interference is low, the phase advance effected in corrector 117 is restricted, thereby avoiding unnecessary phase modulation of the recovered base band signal. Conversely, when the detected level of the sound interference is high, the diode bias level is changed so that the phase advance of the baseband signal effected in corrector 117 is suitably altered to insure a reasonably quiet background in pictures displayed in response to the signal recovered upon record playback.

Feedback loop 144 functions in a manner similar to feedback loop 142. A band pass filter 140, coupled to the output of diode 124, is tuned to pass frequencies where video interference is present (e.g., the color subcarrier 1.53 MHz or the horizontal sync 15 KHz). From there, the video interference signal is passed to peak detector 138. The peak detector output is coupled to a servo apparatus 136 for minimizing the video interference. The servo apparatus output is coupled, via the closed contacts of switch 115, to an input of bias generator 126 which provides a DC bias current in response to the output of servo apparatus 136. The operation of generator 126 and servo apparatus 136 will be explained with reference to FIGS. 4 and 5, respectively. The servo apparatus 136 adjusts the output of the bias generator 126 to minimize the video interference. The output of bias generator 126 is, in turn, utilized to control the bias of the diode 124 in a manner which effects adjustable aperture correction of the signal.

The embodiment of the invention corresponding to the system shown in FIG. 2 with the contacts of switches 114 and 115 in the closed position, provides a diode bias magnitude which may be programmed for level changes in the interference. Such a programmable system assures reproduction with substantially less interference. It will be appreciated, however, that a simpler system, which corresponds with the system of FIG. 2, with the contacts of switches 114 and 115 open, also provides adequate reproduction with reduced interference. A fixed bias magnitude setting for diode 118 (e.g., 1.6 volts) throughout record playback effects on the average a 9 db decrease in the maximum sound beat.

In another embodiment of FIG. 2, the diode bias setting may be programmed for level changes dependent upon the location of the groove convolution subject to playback. Bias generators 120 and 126 may be manually adjusted as the stylus moves from an outer groove convolution to an inner groove convolution on the disc surface. Advantageously, bias generators 120 and 126 may be rendered responsive to position sensor 91 with switch 95 of FIG. 1 closed. The operation of position sensor 91 will be explained with reference to FIG. 3. Since the compensation necessary to reduce interference is a function of the radial position of the stylus on the disc surface, the bias generators 120 and 126 of FIG. 2 can be advantageously rendered responsive to the radial position of the stylus. Position sensor 91, coupled to the non-linear aperture corrector 93, is responsive to the position of carriage 86. In operation, position sensor 91 is used to adjust the output of bias generators 120 and 126 of FIG. 2 in response to the position of carriage 86 on the disc surface.

In FIG. 2, a variant of the system is shown when the switch 110 is opened and switch 112 is closed. The input at terminal x to the aperture correction system is provided through a variable attenuation amplifier 150. A feedback loop couples an output signal of corrector 117 through a band pass filter 152. The band pass filter 152 has a passband which encompasses accompanying sound interference signals and significant side bands thereof, and provides an output to a peak detector 154. The output of the peak detector 154 is, in turn, applied to a control input of the variable attenuation amplifier 150 to keep the level of the input signal to the aperture correction system constant. By keeping the input signal to the aperture correction system constant, aperture correction for significantly large input signals, due, for example, to worn styli should be assured.

Figure 3:
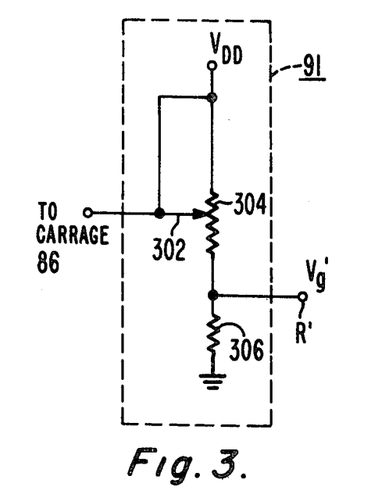
FIG. 3 illustrates a circuit embodiment for the position detector of FIG. 1.

Referring to FIG. 3, one embodiment of the position detector of FIG. 1 is illustrated. The movable contact 302 of the potentiometer 304 is attached to the carriage 86 of video disc player 80 of FIG. 1. Resistor 306 is coupled to potentiometer 304 in series combination. DC voltage $V_{DD}$ (e.g., of positive polarity) is supplied to the series network. Terminal R' coupled to the connection of resistor 306 and potentiometer 304 provides the output voltage $V_g'$ from the position detector 91. In operation voltage $V_g'$ at terminal R' is equal to the voltage $V_{DD}$ multiplied by the ratio of the resistance of potentiometer 304 to the sum of the resistances of potentiometer 304 and resistor 306. As the carriage 86 traverses the disc 84, contact 302 progresses across potentiometer 304 changing the resistance of the potentiometer and therefore changing the output voltage $V_g'$. Output voltage $V_g'$ is used to control the bias current supplied by bias generator 120 of FIG. 2. In this manner the bias voltage to combination 117 is made responsive to the position of stylus on the disc 84. Likewise, output voltage $V_g'$ can be used to control the bias voltage to diode 124 of FIG. 2 when terminal R' is coupled to an input of bias generator 126.

Figure 4:
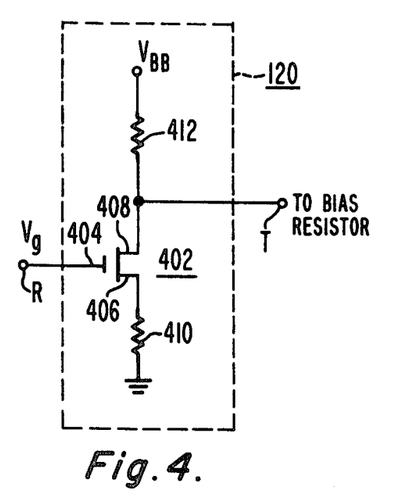
FIG. 4 illustrates a circuit embodiment for the bias generators of FIG. 2.

Referring to FIG. 4, one embodiment of the bias generator 120 of FIG. 2 is illustrated. MOS device 402 has its gate 404 coupled to input terminal R, its source 406 coupled through resistor 410 to ground and its drain 408 coupled through resistor 412 to supply voltage $V_{BB}$ (e.g. of positive polarity). Terminal T, coupled to the connection of resistor 412 and drain 408, provides an output current to bias resistor 122 of FIG. 2. In operation a control voltage $V_g$ is supplied to terminal R by position detector 91 (from terminal R') and/or servo apparatus 130 (from terminal R''). As control voltage $V_g$ changes, the current through the drain of MOS device 402 changes, effecting a change in the bias voltage supplied to corrector 117. Correspondingly, the bias generator described with reference to FIG. 4 could be used as block 126 of FIG. 2 to effect a change in the bias voltage supplied to diode 124.

The operation of servo apparatus 130 of FIG. 2 will now be explained with reference to FIG. 5. A positive voltage $V_P$ from the output of peak detector 132 is present at input terminal P of servo apparatus 130. Voltage $V_P$ is coupled through switches A and B to the inputs of voltage comparator 502. The output from comparator 502 is coupled through switch C to the input of JK flip-flop 504. The output of flip-flop 504 is coupled through resistor 506 and switch D to output terminal R'' and ground.

In operation, switches A, B, C and D are closed and opened sequentially in the order ADBC. At time t switch A is closed and opened. The voltage $V_P(t)$ at time t is stored in voltage comparator 502. Some time T later switch B is closed and opened. The voltage at time (t+T) [i.e., $V_P(t+T)$] is compared to $V_P(t)$ in comparator 502. If $V_P(t+T) < V_P(t)$ the sound beat has decreased during the period T. When the sound beat has decreased the output of comparator 502 is low. Thus, when switch C is closed and opened no pulse is delivered to JK flip-flop 504; therefore, the flip-flop output is unchanged. Let us assume that output of flip-flop 504 is positive. Switch D is now closed to increment the voltage $V_g''$ at terminal R'' which adjusts the bias voltage to combination 117 of FIG. 2 through bias generator 120.

Voltage $V_g''$ will increment until $V_P(t+T) > V_P(t)$ which indicates that the bias voltage to corrector 117 has changed such that the sound beat is increasing. At this time, the output of comparator 502 will be high. Therefore, when switch C is closed, flip-flop 504 will change state from a positive output to a negative output. When switch D is closed, the output voltage $V_g''$ will decrement, causing a decrease in the bias voltage to corrector 117.

Output voltage $V_g''$ will continue to decrement until voltage $V_P(t+T)$ is again greater than $V_P(t)$. At this time flip-flop 504 will change state from negative to positive, incrementing the output voltage $V_g''$. In this manner the servo apparatus 130 provides an output voltage $V_g''$ which alternatively increments and decrements to adjust the bias voltage to corrector 117 to keep the sound beats at a minimum.

Figure 5:
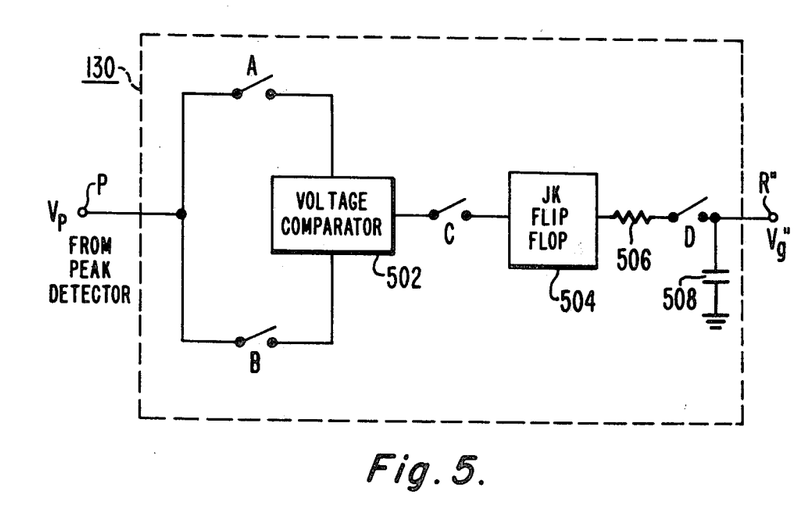
FIG. 5 illustrates a circuit embodiment partially in block diagram form for the servos of FIG. 2.

Advantageously, switches A, B, C and D of the servo of FIG. 5 could be CMOS devices (not shown) which are controlled by clocking pulses from a clock generator (not shown).

Correspondingly, the servo described with reference to FIG. 5 could be used as block 136 of FIG. 2 to effect a change in the bias voltage supplied to diode 124.

The non-linear aperture correctors described with reference to FIGS. 1 and 2 provide effective removal of quadratic intermodulation products but do not necessarily provide effective control of higher order intermodulation products. To effect a substantial control of the higher order intermodulation products, a balanced arrangement for the non-linear aperture corrector of FIGS. 1 and 2 is provided. In this balanced arrangement odd order intermodulation products are substantially eliminated by providing two non-linear signal paths. The signals recovered by the recovery means are applied to both non-linear signal paths. In the first signal path the signals are inverted while in the second they are not; thus, when the signals from the first signal path are combined (e.g., in a linear adder) with signals from the second odd order intermodulation products are substantially removed.

Figure 6:
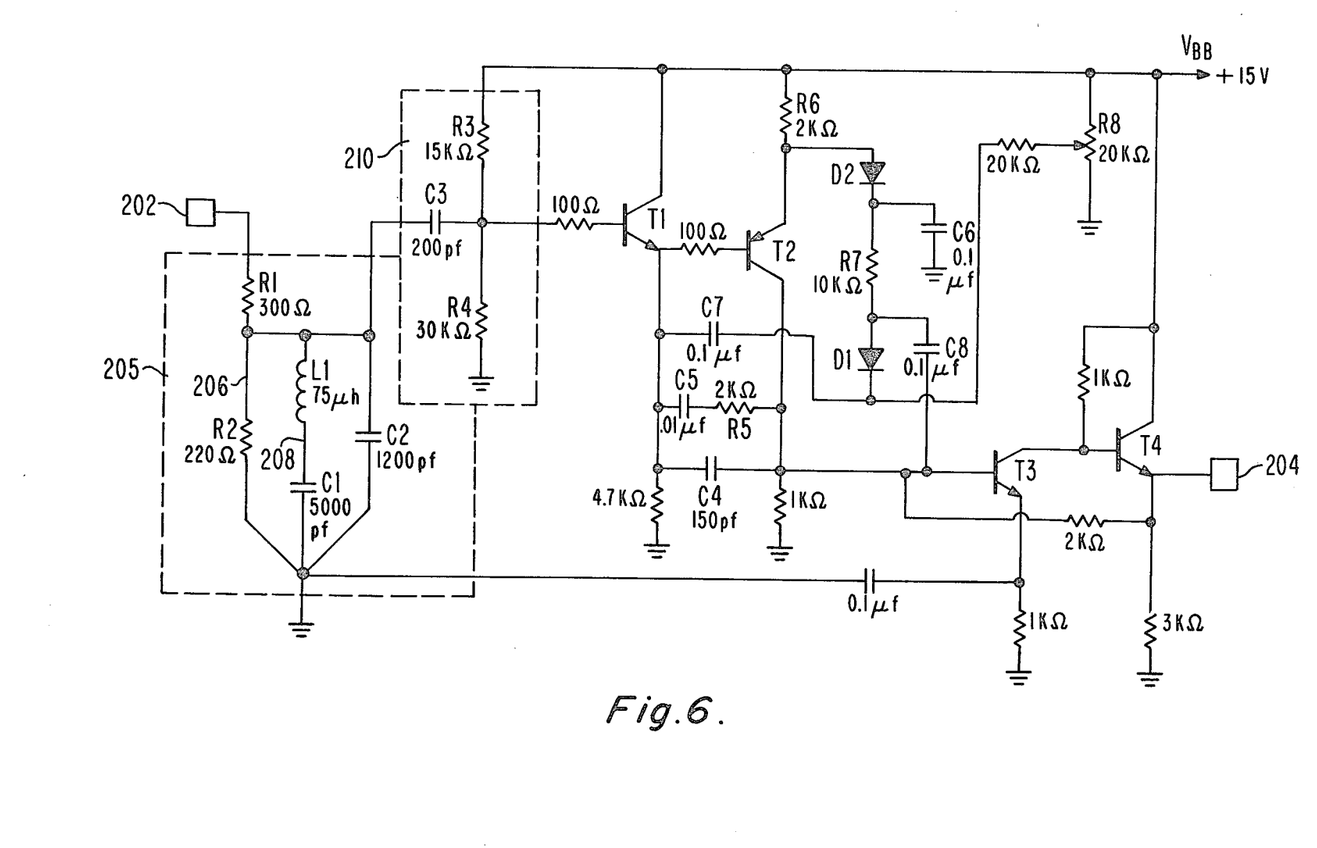
FIG. 6 is a schematic diagram of another embodiment of the non-linear aperture corrector of FIG. 2.

FIG. 6 illustrates a preferred embodiment for the non-linear aperture corrector of FIG. 2 used to reduce sound interference in the video. The circuit elements including combination 117 between terminals 202' and 204' of FIG. 2 are removed and the circuit of FIG. 6 is connected with terminal 202 coupled to terminal 202' and terminal 204 coupled to terminal 204'. Thus, the output from pickup circuit 90 of FIG. 1 is applied to input terminal 202 of FIG. 6 and output terminal 204 of FIG. 6 is coupled to picture carrier bandpass filter 92 of FIG. 1. Switch 110 is closed and switches 112, 114 and 115 are open.

Referring to FIG. 6, input terminal 202 is provided to input network 205. Voltage divider 206, within input network 205, comprises resistors R1 and R2 connected in series. Trap filter 208, which comprises inductor L1 and capacitor C1 connected in series, is connected in parallel with resistor R2 of divider 206. In parallel combination with resistor R2 and trap 208 is capacitor C2.

High pass filter 210, which includes capacitor C3 and resistors R3 and R4, is connected to the output of input network 205 and emitter follower transistor T1 has its base electrode coupled to the output of high pass filter 210 via a small (100 ohm) resistor.

The currents from four signal paths are summed at the base of transistor T3 (of the feedback transistor pair comprising T3 and T4). The first path, which is the main path for the video signal is from the emitter of emitter-follower T1 through capacitor C4 to the base of transistor T3. The second path includes diode D1, which is a non-linear device, and capacitors C7 and C8. The second path provides one of the two legs of a balanced non-linear aperture corrector. The PNP transistor T2 is included in the third path. Diode D2, which is connected to the emitter of inverter transistor T2, provides a non-linear impedance which changes the gain of transistor T2 in a non-linear fashion. The path from the emitter of emitter-follower T1, through the inverter stage T2 to the summing point, the base of transistor T3, provides the second leg of the balanced non-linear aperture corrector. The fourth path is provided through the series connection of a capacitor C5 and resistor R5. This last signal path is present to compensate for the signal of opposite polarity which flows through resistor R6 and the emitter electrode of transistor T2. If the current source were ideal, signal path four could be eliminated.

The cathode of diode D2 is connected to the anode of diode D1 through resistor R7 and the cathode of diode D1 is connected to the slider arm of potentiometer R8. A positive bias voltage is applied to the anode of diode D2 through resistor R6. Additionally, the cathode of diode D2 is connected to ground through a signal path which includes capacitor C6. Capacitor C7 is connected between the emitter of transistor T1 and the cathode of diode D1 and capacitor C8 is connected between the anode of diode D1 to the summing point at the base of transistor T3.

Figure 7A:
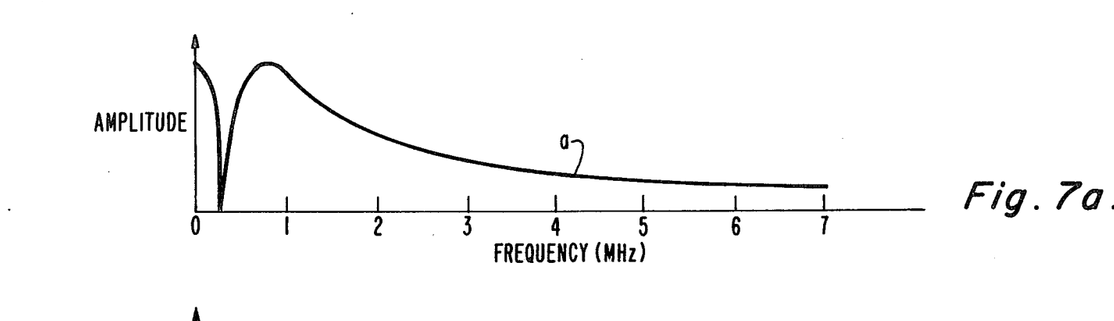
FIG. 7a illustrates the frequency response of the signal shaping network of FIG. 6.

In operation, the output from pickup circuit 90 of FIG. 1 contains non-linear distortions which may result in sound signal interference in the video output display. The non-linear aperture corrector of FIG. 6 effects a substantial removal of these non-linearities. The divider network 206, which is connected to input terminal 202 reduces the level of the input signal so that the signal across the diodes is less than 100 mv peak-to-peak to effect diode operation within the "knee" of their respective response curves. Further, divider 206 provides a resistive source impedance for input network 205. Trap filter 208 is arranged to remove control signals of a particular frequency (e.g., 260 KHz). Above the resonant frequency of trap filter 208, inductor L1 becomes the dominating reactance element and resonates in parallel with capacitor C2 at a frequency which is in the vicinity of the sound carriers (illustratively, in a video disc system having stereo sound accompaniment, the audio signals are caused to frequency modulate low frequency sound carriers over a low frequency deviation range, e.g., 715±50 KHz and 905±50 KHz). The relative phase of the sound carriers and the video carrier must be controlled to provide proper phase alignment. Thus, capacitor C2 is provided to establish proper phasing of the sound carriers. Above the sound carrier frequencies, capacitor C2 dominates and network 205 functions as an integrator. Network 205 provides a 6 db/octave slope for all of the video information, reduces the amplitude of the video and shifts the phase of the video carrier by 90°. The linear transfer characteristic for network 205 is shown by curve "a" of FIG. 7a.

The next section which is the high pass filter 210 has a low frequency cutoff (e.g., 80 KHz). Any low frequency noise which may interfere with the video carrier is filtered out in this stage.

The non-linear aperture correction stage comprises diodes D1 and D2, inverter transistor T2 and capacitor C4. Diodes D1 and D2 are isolated from each other with respect to an AC signal by resistor R7 and capacitors C6, C7 and C8. Nevertheless, as noted above, these diodes, arranged in series, may be bias controlled by a single potentiometer R8. Diodes D1 and D2 are arranged with respect to an AC signal in a balanced configuration such that odd order sound distortions of the video are reduced or eliminated. Since diodes D1 and D2 are biased with the same biasing current, odd order distortions in the signal which are passed through the collector of transistor T2 to the summing point at the base of transistor T3 are balanced with odd order distortions which are passed through diode D1 to the summing point at the base of transistor T3. With the odd order distortions through diode D1 180° out of phase with the odd order distortions through the collector of transistor T2, all odd order distortions are substantially eliminated.

Figure 7B:
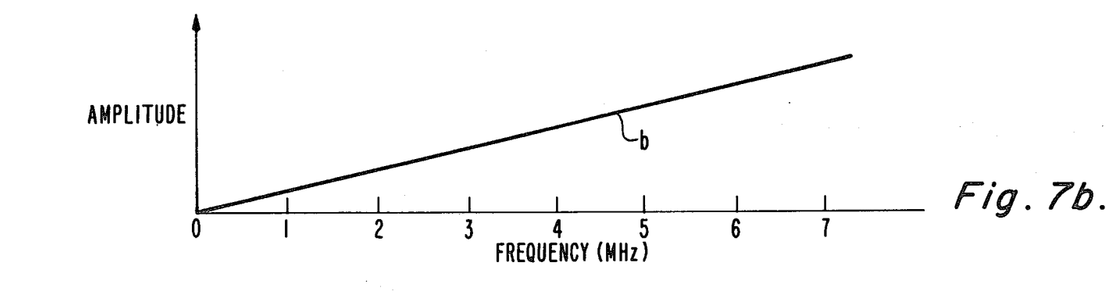
FIG. 7b illustrates the frequency response of the differentiator of FIG. 6.

Simultaneously, even order distortions are substantially eliminated by the modulating effect of the combination of the two non-linear and one linear signal paths. The capacitor C4 in combination with transistor feedback pair T3 and T4 effect a differentiation of the video signal which shifts its phase by approximately 90°. The linear transfer characteristic for the differentiator (i.e., capacitor C4 and transistor feedback pair T3 and T4) is illustrated by curve "b" of FIG. 7b. Taking the signal at the emitter of T1 as a reference phase, it can be seen that the non-linear elements D1 and D2 pass the video carrier to the summing node (base of T3) either with the same polarity through D1 for negative portions of the audio carriers or inverted through T2 for positive portions of the audio carrier. Thus, the non-linear elements may be considered to be generating intermodulation products that are in phase with the signal at the emitter of T1. The reactance of C4 causes the main signal at the summing node to be in quadrature to the main signal at the emitter of T1 and therefore in quadrature with respect to the intermodulation products generated by D1 and D2. The result is phase modulation of the video carrier by the audio carriers. The amplitude of the intermodulation products produced and therefore the amount of phase modulation is a function of the diode bias current which may be adjusted such that the phase modulation affected in diodes D1 and D2 substantially cancels the phase modulation effected by the non-linear recovery means.

For another explanation of the operation of the non-linear aperture corrector consider a signal S(t) having even order intermodulation products produced by the recovery means at the emitter of transistor T1. The diodes D1 and D2 will contribute even order distortion components (i.e., $S^2(t)$ plus higher even order distortions of insignificant amplitude) which are "in phase" with the signal S(t). In particular, the diode currents will contain audio sidebands to the video carrier (e.g., signals at 5±0.715 MHz and 5±0.905 MHz). Simultaneously, the main video signal is conveyed through capacitor C4 in quadrature with the signal S(t) at the emitter of T1. The combination of these signals at the summing node (i.e., base of transistor T3) contains substantially no intermodulation since the sidebands generated by the diodes D1 and D2 effectively cancel the sidebands which were generated in the original signal by the non-linear recovery device.

Figure 7C:
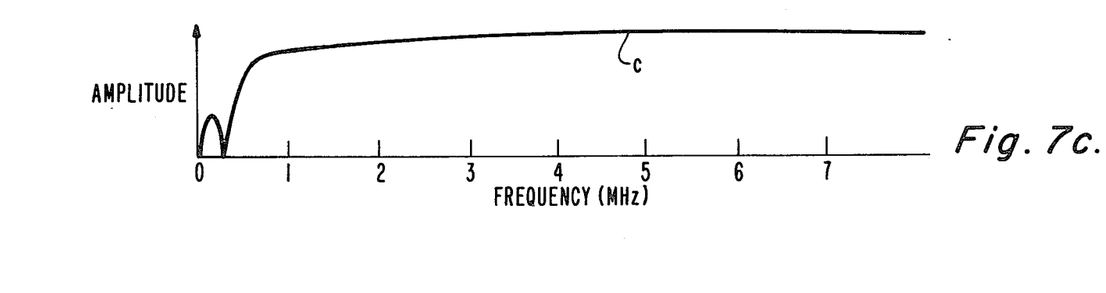
FIG. 7c illustrates the overall frequency response of the non-linear aperture corrector of FIG. 6.

The integration provided by network 205 complements the differentiation effected in capacitor C4 to produce a nearly flat response for the non-linear aperture corrector. Curve "c" of FIG. 7c demonstrates the overall response of the non-linear aperture corrector of FIG. 6.

It should be noted that a negative going signal from pickup circuit 90 of FIG. 1 will effect a phase advance in the non-linear aperture corrector of FIG. 2 (with switch 110 closed) while the same signal will effect a phase retardation in the non-linear aperture corrector of FIG. 6 when feeding input terminal 202. This illustrates the polarity dependence of the non-linear aperture corrector. When the polarity of the signal output from pickup 90 of FIG. 1 is more negative for a sound peak than a sound valley the aperture corrector should be arranged to effect a phase advance as the input signal goes more negative (e.g., as arranged in FIG. 2). On the other hand, when the polarity of the input signal to the aperture corrector is more positive for a sound peak than a sound valley, the aperture corrector should be arranged to effect a phase advance as the input signal goes more positive (e.g., as arranged in FIG. 6).

It will be appreciated that the non-linear aperture corrector circuit may be implemented by other techniques. For example, the integrator could be arranged after the differentiator rather than before. However, there are certain advantages in arranging the integrator as shown in FIG. 2, that is, its effect on the ratio of the amplitude of video and audio signals prior to passing them through the non-linear aperture corrector. First, by reducing the amplitude of the video carrier, the diodes are operated over a smooth section of their non-linear characteristics, i.e., the diodes never cut off. Secondly, the modulation of the sound beat is better controlled. The audio carriers are attenuated by the ratio of resistors R1 and R2 while the video carrier is attenuated by the ratio of the resistors times the integration effect of the integrator. Increasing the amplitude of the audio carriers with respect to the amplitude of the video carrier effects more modulation with less distortion of the video carrier.

It will be further appreciated that the input circuit and feedback pair of transistors may be implemented with a balanced or non-balanced non-linear aperture corrector.

Additionally, it should be appreciated that the specific balanced arrangement as described with reference to FIG. 6 may be implemented by other means. For example, the inversion of the balanced signal may be effected after modulation of the signal rather than before.

It will be appreciated that the present invention will be found useful in any system wherein the transducer device-information track interface causes interference signals to be generated. This is true of grooved as well as grooveless systems in combination with any one of a number of transducer devices.

What is claimed is:

1. In a disc record player for information recovery of video and sound signals, an apparatus comprising:
    means for recovering modulated information signals having different components including composite color video signals with sound accompaniment from a disc record, said recovery means having a non-linear response which produces intermodulation distortions between said different components of the modulated information signals;
    a non-linear compensating means, coupled to said recovery means, for reducing said intermodulation distortions resulting from the non-linear response of the recovery means, in the recovered signals;
    means, coupled to said compensating means, for demodulating the information signals; and
    means, coupled to said demodulating means, for processing said demodulated signals.

2. The apparatus as defined in claim 1 wherein said non-linear compensating means reduces sound interference in the recovered video signals.

3. The apparatus as defined in claim 1 wherein said non-linear compensating means reduces video interference in the recovered sound accompaniment signals.

4. The apparatus as defined in claim 2 wherein said compensating means comprises:
    a non-linear device, coupled to said recovery means;
    wherein said non-linear device effects a phase shift of the video signals in response to the levels of the sound signals in the recovered signals.

5. The apparatus as defined in claim 4 wherein said non-linear device comprises a diode and a capacitor in parallel combination.

6. The apparatus as defined in claim 4 wherein said disc record has said information recorded in a spiral information track in at least one surface of said disc; wherein said recovery means comprises: a stylus adapted for tracking said spiral information track; a turntable for supporting said disc record in a playing position; and turntable rotating means for establishing relative motion between said disc information track and said stylus, said apparatus further comprising:
    means, coupled to said stylus, for sensing the radial position of said stylus on said disc surface; and
    variable bias voltage supply means; coupled to said sensing means, for varying the bias voltage to said non-linear device in response to the radial position of said stylus on said disc, the bias voltage to said non-linear device being varied to minimize the sound interference in the recovered video signals.

7. The apparatus as defined in claim 4 further comprising:
    variable bias voltage supply means, coupled to said non-linear device, the output signal level of said supply means varying the characteristics of said non-linear device to effect a phase shift of the video signals in response to the level of the sound interference in the recovered video signals;
    means, coupled to the output of said non-linear device, for detecting the sound interference level in the recovered video signals; and
    means, coupled to said detection means, for adjusting the output signal level of the bias supply means.

8. The apparatus as defined in claim 3 wherein said compensating means further comprises:
    a non-linear device, coupled to said recovery means;
    wherein said non-linear device effects a modulation of said recovered signals to effect a reduction of the video interference in the sound accompaniment signals.

9. The apparatus as defined in claim 8 wherein said non-linear device is a diode.

10. The apparatus as defined in claim 8 wherein said disc record has said information recorded in a spiral information track in at least one surface of said disc; wherein said recovery means comprises: a stylus adapted for tracking said spiral information track; a turntable for supporting said disc record in a playing position; and turntable rotating means for establishing relative motion between said disc groove and said stylus; said apparatus further comprising:
    means, coupled to said stylus, for sensing the radial position of said stylus on said disc surface; and
    variable bias voltage supply means, coupled to said sensing means, for varying the bias voltage to said non-linear device in response to the radial position of said stylus on said disc, the bias voltage to said non-linear device being varied to minimize the video interference in the recovered sound signals.

11. The apparatus as defined in claim 8 further comprising:
    variable bias voltage supply means, coupled to said non-linear device, the output signal level of said supply means varying the characteristics of said non-linear device to effect a modulation of said recovered signals in response to the level of the video interference in the recovered sound accompaniment signals;
    means, coupled to the output of said non-linear device, for detecting the video interference level in the recovered sound accompaniment signals; and means, coupled to said detection means, for adjusting the output level of the bias supply means.

12. The apparatus as defined in claim 1 further comprising:
   variable attenuation amplifier means, coupled between said recovery means and said non-linear compensating means; and
   means, coupled to the output of said non-linear compensating means, for detecting the output signal level of said compensating means;
   said detector means being coupled to a control input of said amplifier means;
   whereby the attenuation of said amplifier is varied in response to said detected output signal level, the attenuation being varied to maintain the input signal level to said compensating means substantially constant.

13. A playback apparatus for information recovery from a record medium comprising:
   means for recovering modulated information signals having different components from said record medium, said recovery means having a non-linear response which produces intermodulation distortions between said different components of the modulated information signals;
   a non-linear compensating means, coupled to said recovery means, for reducing said intermodulation distortions resulting from the non-linear response of the recovery means, in the recovered signals;
   means, coupled to said compensating means, for demodulating the information signals; and
   means, coupled to said demodulating means, for processing said demodulated signals.

14. In a disc record player for information recovery of video and sound signals, an apparatus comprising:
   means for recovering modulated information signals including composite color video signals with sound accompaniment from a disc record, said recovery means having a non-linear response which produces intermodulation products between said video and sound signals;
   a non-linear compensating means, coupled to said recovery means, for reducing interference, resulting from the non-linear response of the recovery means, in the recovered signals; said non-linear compensating means comprising:
   a. a first non-linear signal path for transferring signals recovered from said recovery means;
   b. a second non-linear signal path for transferring signals recovered from said recovery means; and
   c. means for combining the signals carried over said first and second non-linear paths; whereby the output signals from said combining means are substantially free of said intermodulation products;
   means, coupled to said non-linear compensating means, for demodulating the information signals; and
   means, coupled to said demodulating means, for processing said demodulated signals.

15. The apparatus according to claim 14 wherein said first non-linear signal path and said second non-linear signal path generate intermodulation products of substantially equal magnitude whereby the intermodulation products which are generated in said first non-linear path are combined with the intermodulation products which are generated in said second non-linear path in said combining means such that said intermodulation products which are generated in said non-linear paths and in said recovery means are substantially eliminated.

16. The apparatus according to claim 15 wherein said first non-linear path includes a first diode connected in said first path and wherein said second non-linear path includes a second diode connected in said second path.

17. The apparatus according to claim 16 wherein said first and second diodes are forward biased to substantially the same point on the knee of their respective characteristic curves.

18. The apparatus according to claim 14 wherein said non-linear compensating means further comprises a linear signal path for carrying signals recovered from said recovery means.

* * * * *